US008289930B2

(12) United States Patent
Kamei (10) Patent No.: US 8,289,930 B2
(45) Date of Patent: Oct. 16, 2012

(54) WIRELESS COMMUNICATION TERMINAL, COMMUNICATION CONTROL METHOD OF WIRELESS COMMUNICATION TERMINAL, AND WIRELESS COMMUNICATION SYSTEM (75) Inventor: Tasuku Kamei, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 673 days.

(21) Appl. No.: 12/447,881

(22) PCT Filed: Oct. 30, 2007

(86) PCT No.: PCT/JP2007/071080
§ 371 (c)(1),
(2), (4) Date: Oct. 13, 2009

(87) PCT Pub. No.: WO2008/053569
PCT Pub. Date: May 8, 2008

(65) Prior Publication Data
US 2010/0067492 A1 Mar. 18, 2010

(30) Foreign Application Priority Data
Oct. 30, 2006 (JP) ................................. 2006-294709

(51) Int. Cl.
*H04W 36/00* (2009.01)
(52) U.S. Cl. ...................... 370/332; 455/403; 455/435.2; 455/550.1
(58) Field of Classification Search .................. 370/332, 370/338, 328, 312, 313, 310.1–310.2, 395.5–395.54, 370/466, 467, 469; 455/550.1, 403, 435.2
See application file for complete search history.

(56) References Cited

U.S. PATENT DOCUMENTS

| 7,885,655 | B2 * | 2/2011 | Yin ............................... 455/436 |
| 7,907,889 | B2 * | 3/2011 | Fujita et al. ................... 455/3.02 |
| 2003/0109272 | A1 * | 6/2003 | Mousseau et al. ............ 455/517 |
| 2004/0172586 | A1 * | 9/2004 | Ragnet et al. ................. 715/500 |
| 2008/0004014 | A1 * | 1/2008 | Palviainen ................. 455/435.1 |
| 2010/0136964 | A1 * | 6/2010 | Ishihara ..................... 455/422.1 |

FOREIGN PATENT DOCUMENTS

| JP | 2000-201382 | 7/2000 |
| JP | 2003-023665 | 1/2003 |
| JP | 2006-229827 | 8/2006 |

OTHER PUBLICATIONS

Japanese language office action dated Dec. 13, 2011 and its English language translation issued in corresponding Japanese application 2006294709.

* cited by examiner

*Primary Examiner* — Cong Tran
(74) *Attorney, Agent, or Firm* — DLA Piper LLP (US)

(57) ABSTRACT

A wireless communication terminal, a wireless communication terminal communication control method, and wireless communication system for efficiently acquiring a communication system when a call occurs even when the terminal is judged out of service area. When a communication system selecting section (185) receives a request of a acquisition instruction function executing section (186) to acquire a communication system due to an out-of-service-area call, the communication system selecting section (185) allows a protocol executing section (EVDO protocol executing section (183) or a "1x" protocol executing section (184)) to try acquire of one of a communication systems in response to the request until acquisition of a communication system succeeds according to predetermined procedures. If receiving another acquisition instruction during the acquire, the communication system selecting section (185) allows the protocol executing section to try to acquire the next communication system of the communication system which the protocol executing section has lastly failed to acquire a communication system in the previous acquire processing.

18 Claims, 7 Drawing Sheets

WIRELESS COMMUNICATION TERMINAL, COMMUNICATION CONTROL METHOD OF WIRELESS COMMUNICATION TERMINAL, AND WIRELESS COMMUNICATION SYSTEM

CROSS-REFERENCE TO THE RELATED APPLICATIONS

This application is a national stage of international application No. PCT/JP2007/071080 filed Oct. 30, 2007, which also claims the benefit of priority under 35 USC 119 to Japanese Patent Application No. 2006-294709 filed Oct. 30, 2006, the entire contents of which are incorporated herein by reference.

TECHNICAL FIELD

The present invention relates to a wireless communication terminal, a communication control method of a wireless communication terminal, and a wireless communication system which are applicable to, for example, a multiband wireless communication system.

BACKGROUND ART

A wireless communication terminal applied to CDMA (Code Division Multiple Access) communication starts a channel acquisition operation when sending or receiving a signal or when transferring data. Further, the wireless communication terminal obtains configuration information and timing information of the acquired channel and obtains position registration information etc. synchronized with the timing of the acquired channel.

In this regard, the received signal strength of this channel sometimes remarkably falls according to the environment (topography, buildings, etc.) in which the wireless communication terminal is used.

In a wireless communication terminal, when the received signal strength of the channel is low, regardless of the fact that the signal of the channel was received, the terminal judges that the channel could not be acquired and starts a restitute processing (a process to back to service area from no service area, or a process to re-acquire the other channel to back to the idle state). In this restitute processing, the wireless communication terminal runs a system scan where the terminal acquires a channel by a predetermined cycle.

When the wireless communication terminal is out of service area, the wireless communication terminal internally turns a flag showing it is "out-of-service-area" (out-of-service-area flag) ON. In such a situation, even if the user performs a send operation, the wireless communication terminal did not start up the send processing since the possibility of transmission was low while the out-of-service-area flag is ON and in general for saving power.

Further, once the terminal judged "out-of-service-area", the terminal carries out the restitute processing by a predetermined cycle, but the communication schemes for running a system scan for reset are limited and the time required for restitute processing can no longer be ignored. For example, when exiting from or entering a tunnel or at another location where the usage environment is extremely different, desirably the restitute processing is carried out immediately after exiting from the tunnel. However, immediate reset is not possible unless at the timing of an restitute acquisition operation.

Further, even if performing the restitute acquisition processing, this does not always lead to an immediate restitution into the service area.

In order to overcome the problem described above, the art is proposed of performing a channel acquisition operation if performing a send operation even when the terminal judged "out-of-service-area" (see, for example, Patent Document 1).
Patent Document 1: Japanese Patent Publication (A) No. 2003-23665

DISCLOSURE OF THE INVENTION

Problem to be Solved by the Invention

According to the art disclosed in the above Patent Document 1, the call success rate can be improved in restitute processing.

In this regard, recently, it has become possible for one wireless communication terminal to use a plurality of frequency bands (for example, 800 MHz and 2 GHz). Further, wireless communication terminals able to handle a plurality of communication protocols (for example, CDMA2000_1x and EVDO protocol) have been increasing.

Under such a situation, with just restitute acquisition processing of a plurality of channels for a single communication system, the signal will not necessarily be sent by the communication scheme desired by the user.

The present invention provides a wireless communication terminal compliant with a plurality of communication schemes, a communication control method of a wireless communication terminal, and a wireless communication system, which efficiently perform acquisition of a communication system and which can achieve connection by the communication scheme desired by the user as much as possible when send processing occurs even in a state judged "out-of-service-area".

Means for Solving the Problem

A wireless communication terminal of a first aspect of the present invention is a wireless communication terminal including: a communication part capable of acquiring a plurality of communication systems and capable of communication by a predetermined communication protocol; and a control part which controls communication by the communication part by any of the plurality of communication systems using the predetermined communication protocol when a send operation is instructed, wherein the control part sends the communication part an acquisition instruction instructing the acquisition processing until success in a predetermined sequence by the predetermined communication protocol by any of the plurality of communication systems when receiving an instruction of a send operation in a state judged "out-of-service-area", sends the acquisition instruction again to the communication part when a predetermined time has passed before acquisition success is informed for the acquisition instruction, performs processing for starting communication by a successfully acquired communication system when an acquisition success is informed for the acquisition instruction, and controls the system so as to perform the acquisition processing from a communication system next to a communication system last failing in acquisition in a previous acquisition processing in the predetermined sequence when receiving a new acquisition instruction during execution of the acquisition processing.

Preferably, the control part instructs the communication part to end the acquisition when a number of times of the acquisition instruction reaches a predetermined number of times or a second predetermined time longer than the predetermined time is reached from when the send operation was instructed.

Preferably, the terminal further includes a display part, and the control part makes the display part display sending failure when instructing the communication part to end the acquisition.

Preferably, the control part makes the predetermined communication system start the acquisition processing based on the new acquisition instruction when the acquisition based on the previous acquisition instruction for the predetermined communication protocol is currently in progress when receiving the new acquisition instruction.

Preferably, the control part judges that the acquisition for the predetermined communication system failed and makes the communication system next to the predetermined communication system in the predetermined sequence start the acquisition processing based on the new acquisition instruction when only acquisition for the predetermined communication system is carried out as the acquisition processing based on the previous acquisition instruction and the new acquisition instruction is received in a state when the control part has not yet been judged whether or not the acquisition for the predetermined communication system is successful.

A wireless communication terminal of a second aspect of the present invention is a wireless communication terminal including: a communication part capable of acquiring a plurality of communication systems and capable of communication by a predetermined communication protocol; and a control part which controls communication by the communication part by any of the plurality of communication systems using the predetermined communication protocol when a send operation is instructed, wherein the control part has a communication system selection part instructing the communication part of the communication system to be acquired, a protocol execution part instructing the communication part of acquisition by the predetermined communication protocol, and an acquisition instruction function execution part instructing the communication system selection part of the start of acquisition of the communication system, the acquisition instruction function execution part sends the communication system selection part an acquisition instruction instructing the acquisition of any of the plurality of communication systems when receiving an instruction of a send operation in a state judged "out-of-service-area" in which communication cannot be carried out, sends to the communication system selection part the acquisition instruction again when a predetermined time has passed before acquisition success is informed for the acquisition instruction, and performs processing for starting communication by a successfully acquired communication system when acquisition success is informed for the acquisition instruction, and the communication system selection part makes the protocol execution part perform the acquisition processing for the plurality of communication systems according to a predetermined sequence until the acquisition is successful when receiving the acquisition instruction, informs the acquisition instruction function execution part that the acquisition was successful when the acquisition was successful in any communication system, and makes the protocol execution part perform the acquisition processing from a communication system next to the communication system last failing in acquisition in the previous acquisition processing in the predetermined sequence when receiving a new acquisition instruction during execution of the acquisition processing.

Preferably, the acquisition instruction function execution part instructs the communication system selection part to end the acquisition when a number of the acquisition instruction reaches a predetermined number or a second predetermined time longer than the predetermined time is reached from when the send operation was instructed.

Preferably, the terminal further includes a display part, and the acquisition instruction function execution part makes the display part display sending failure when instructing the communication part of ending the acquisition to end the acquisition.

Preferably, the communication system selection part makes the protocol execution processing part start the acquisition processing based on the new acquisition instruction from the predetermined communication system when the protocol execution processing part is in the middle of acquisition based on the previous acquisition instruction for the predetermined communication protocol when receiving the new acquisition instruction.

Preferably, the communication system selection part judges that the acquisition for the predetermined communication system failed when receiving the new acquisition instruction in a state where only the acquisition for the predetermined communication system was carried out at the protocol execution processing part as the acquisition processing based on the previous acquisition instruction and the judgment whether or not the acquisition for the predetermined communication system was successful has not yet been made and makes the protocol execution part start the acquisition processing based on the new acquisition instruction from the communication system next to the predetermined communication system in the predetermined sequence.

Preferably, the protocol execution part includes a first protocol execution part instructing the communication part of the acquisition according to the first communication protocol and a second protocol execution part instructing the communication part of the acquisition according to the second communication protocol, and the communication system selection part selects either of the first protocol execution part and the second protocol execution part and makes the execution part perform the acquisition processing.

Preferably, the state "out-of-service-area" is a state where neither the first protocol execution part nor the second protocol execution part can acquire any of the communication systems, the acquisition instruction function execution part makes the display part display "out-of-service-area", and the restitute processing by the communication part is executed.

A third aspect of the present invention is a communication control method of a wireless communication system including: a communication part capable of acquiring a plurality of communication systems and capable of executing communication by a predetermined communication protocol; and a control part which controls communication by the communication part by any of the plurality of communication systems using a predetermined communication protocol when a send operation is instructed, wherein the control part sends the communication part an acquisition instruction instructing the acquisition processing by any of the plurality of communication systems in a predetermined sequence until the acquisition is successful according to the predetermined communication protocol when receiving a send instruction in a state judged "out-of-service-area" in which communication cannot be carried out, sends the communication part the acquisition instruction again when a predetermined time has passed before the acquisition success is informed for the acquisition instruction, performs the processing for starting the communication by the successfully acquired communication system when the acquisition success is informed for the acquisition instruction, and performs the acquisition processing from a communication system next to the communication system last failing in acquisition in the previous acquisition processing in the predetermined sequence when receiving a new acquisition instruction during execution of the acquisition processing.

A wireless communication system of a fourth aspect of the present invention includes: a base station; and a wireless communication terminal performing wireless communication with the base station through a channel assigned by the base station, wherein the wireless communication terminal has a communication part capable of acquiring a plurality of communication systems and capable of executing communication according to a predetermined communication protocol and a control part which controls communication by the communication part by any of the plurality of communication systems using the predetermined communication protocol when a send operation is instructed, wherein the control part sends the communication part an acquisition instruction instructing the acquisition processing until success in a predetermined sequence by the predetermined communication protocol by any of the plurality of communication systems when receiving a send instruction in a state judged "out-of-service-area", sends the acquisition instruction again to the communication part when a predetermined time has passed before an acquisition success is informed for the acquisition instruction, performs processing for starting communication by a successfully acquired communication system when an acquisition success is informed for the acquisition instruction, and controls the system so as to perform the acquisition processing from a communication system next to a communication system last failing in acquisition in a previous acquisition processing in the predetermined sequence when receiving a new acquisition instruction during execution of the acquisition processing.

Effects of the Invention

According to the present invention, even in a state judged "out-of-service-area", a communication system is efficiently acquired when send processing occurs, so it becomes possible to achieve connection according to the communication scheme desired by the user as much as possible.

EXPLANATION OF NOTATIONS

1 . . . wireless communication system, 10 . . . wireless communication terminal, 11 . . . communication part, 12 . . . operation part, 13 . . . voice processing part, 14 . . . speaker, 15 . . . microphone, 16 . . . display part, 16? . . . memory part, 18 . . . control part, 181 . . . key detection part, 182 . . . display control part, 183 . . . EVDO protocol execution part (first protocol execution part), 184 . . . "1x" protocol execution part (second protocol execution part), 185 . . . communication system selection part, 186 . . . acquisition instruction function execution part, 1851 . . . scan list, 1852 . . . counter region (count), and 1860 . . . acquired result region.

BEST MODE FOR WORKING THE INVENTION

Below, embodiments of the present invention will be explained with reference to the attached drawings.

First, a communication system to which a wireless communication terminal according to an embodiment of the present invention can be applied will be explained.

Figure 1:
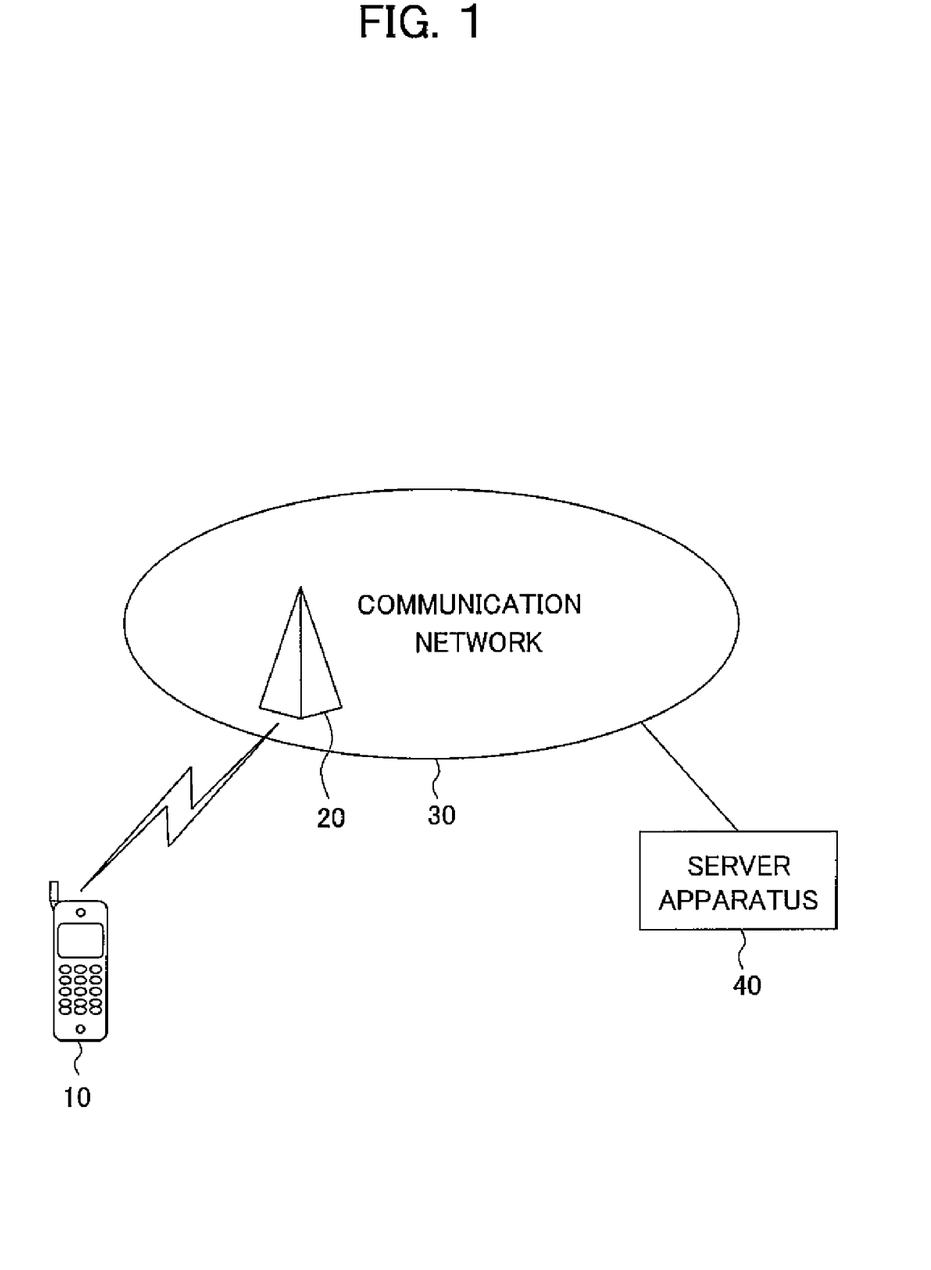
FIG. 1 is a view of the system configuration showing a wireless communication system to which a wireless communication terminal according to an embodiment of the present invention is applied.

FIG. 1 is a view of the system configuration showing a wireless communication system to which a wireless communication terminal according to an embodiment of the present invention is applied.

A wireless communication system 1 is, as shown in FIG. 1, configured by a wireless communication terminal 10, base station 20, communication network 30, and server apparatus 40.

The wireless communication terminal 10 according to the present embodiment, as shown in FIG. 1, has a function of using the wireless communication part to request desired data via the base station 20 and through the communication network 30 to the server apparatus 40 and displaying Web data or other information obtained via the base station 20 in response to the request on the display part.

Note that, in the present embodiment, the explanation will be given illustrating a mobile phone as the wireless communication terminal. Note that, in the present embodiment, while the explanation is given illustrating a mobile phone as the wireless communication terminal, the embodiment can be applied to other wireless communication terminals as well.

In recent years, in the wireless communication system 1, effective utilization of the frequency bands used has been promoted. Reorganization of frequency bands has been studied for making the frequencies used match with standard global specifications.

For example, in a wireless communication system using CDMA2000_1x protocol, at present, in Japan, the Japanese specification 800 MHz band (hereinafter, referred to as "the present 800 MHz band") is being used. There are plans for reorganizing this frequency band to a new 800 MHz band of the standard global specification.

Note that, the present 800 MHz band and the new 800 MHz band differ in frequency assignment etc. between the uplink (communication from the wireless communication terminal 10 to the base station 20 side) and downlink (communication from the base station 20 side to the wireless communication terminal 10) in the frequency band used.

In view of this background, a multi-band adaptive wireless communication terminal capable of communication in the present frequency band (800 MHz at the present), new frequency band (new 800 MHz), and high frequency band (2 GHz) is being developed.

A multi-band adaptive wireless communication terminal 10 engages in wireless communication with the base station 20 through the channel assigned by the base station 20. At this time, the wireless communication terminal 10 can transmit and receive wireless signals in a plurality of frequency bands. Specifically, the wireless communication terminal 10 can transmit and receive wireless signals by using the existing frequency band (old 800 MHz), new frequency band (new 800 MHz), and high frequency band (2 GHz).

The above communication systems with different frequency bands are assigned identification numbers for the base station 20 and the wireless communication terminal 10 to discriminate the frequency bands constituted by the "band classes" prescribed in 3GPP2 (3rd Generation Partnership Project 2).

For example, in a list of nearby base stations etc. in information informed from the base station 20 to the wireless communication terminal 10, this band class is used for reporting the communication systems existing around the wireless communication terminal 10 and so on.

Note that, the existing frequency band (present 800 MHz) is classified as the "band class 3", the new frequency band (new 800 MHz) is classified as the "band class 0", and the high frequency band (2 GHz) is classified as the "band class 6".

Further, each band class is assigned a primary channel and a secondary channel (however, only the primary channel in the EVDO communication of band class 6). Further, when considering the difference of protocols (EVDO), there are a total of 11 patterns of communication systems.

Figure 2:
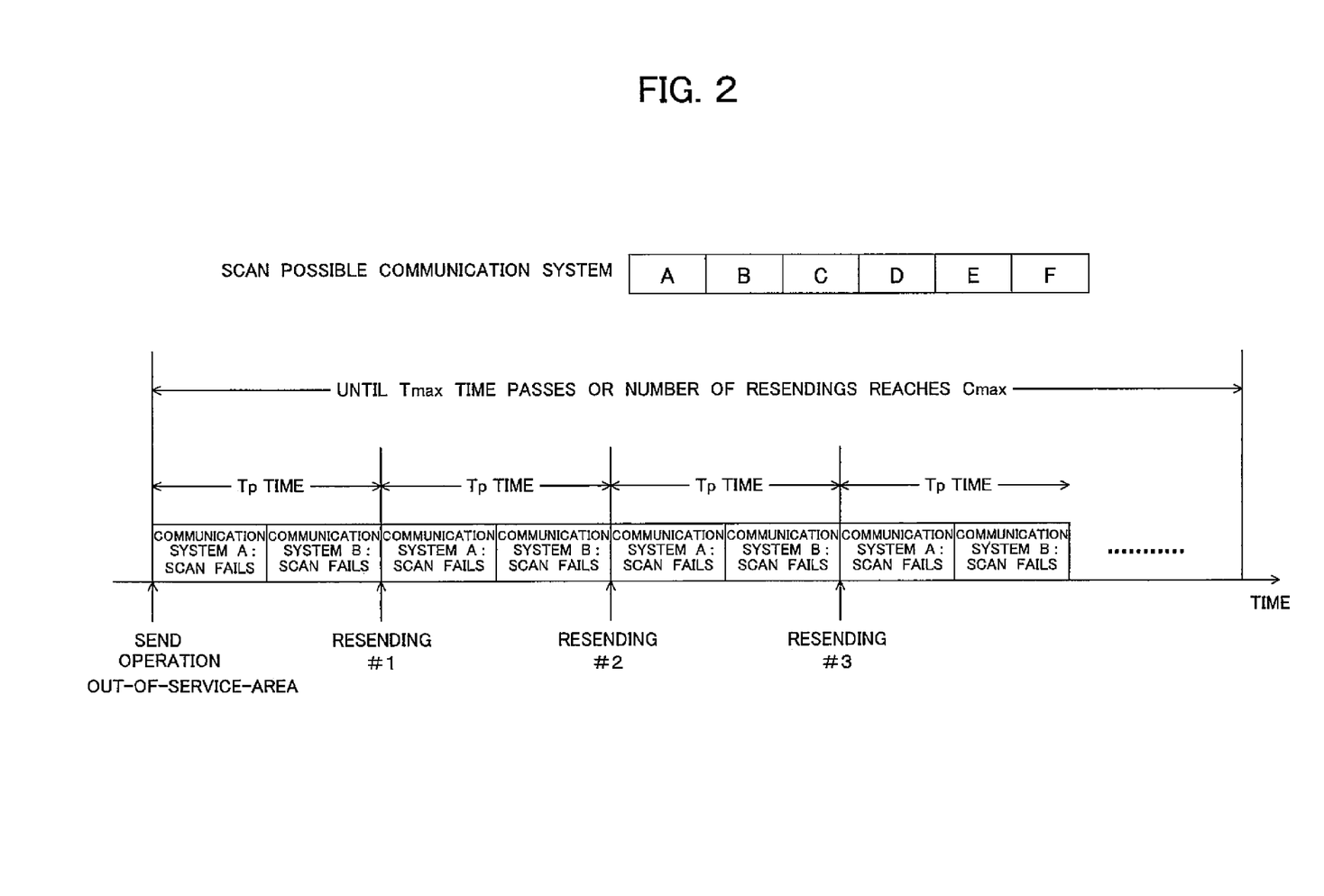
FIG. 2 is a timing chart showing a first send operation from an "out-of-service-area" state of a multiband wireless communication terminal on a time axis.

Below, a first transmission operation TMS1 from an "out-of-service-area" state of a multiband wireless communication terminal 10 having the above 11 patterns of communication systems will be explained.

FIG. 2 is a timing chart showing a first transmission operation TSM1 from the "out-of-service-area" state of a multi-band wireless communication terminal on a time axis.

Below, the first transmission operation TSM1 from the "out-of-service-area" state of a multiband wireless communication terminal will be explained in detail with reference to FIG. 2.

The wireless communication terminal 10 is provided with a scan list in which communication (acquisition) enabled communication systems are stored.

When detecting a send operation "out-of-service-area", the wireless communication terminal 10, as shown in FIG. 2, outputs an acquisition instruction from a communication system A stored at the head position of the scan list. After that, the wireless communication terminal 10 performs an acquisition attempt (hereinafter referred to as a "system scan") of communication systems (here, communication systems A to F) stored in the scan list until the acquisition of the communication systems B, C, and D is successful.

Specifically, when detecting an "out-of-service-area" send request, the wireless communication terminal 10 acquires the communication system (here, system A) stored at the head position of the scan list as a scan candidate and first performs a system scan of the communication system A.

Then, when the acquisition of that communication system A fails, the wireless communication terminal 10 acquires a communication system B stored at the second position of the scan list next and performs a system scan of this communication system B.

The above scanning of communication systems is executed for a Tp time (for example, 4 seconds). Here, when it is detected that 4 seconds have passed, a system scan instruction (re-sending #1) by transmission is output again. The above system scan and re-sending are repeatedly executed (re-sending #1 to #n).

Note that, in FIG. 2, Tmax indicates a time-out time when the send processing itself is ended. For example, when the communication with the base station 20 is not possible even when the send operation is continued for 40 seconds, the send operation automatically ends. Note that, at this time, the end of the send processing may be defined according to the number of re-tries (Cmax) regardless of the time.

According to the send operation 1 from the "out-of-service-area" state described above, when the system scan is not successful within the Tp time at the time of the "out-of-service-area" send operation, a system scan by a re-send operation is requested. Upon receipt of this, the wireless communication terminal starts the system scan again from the communication system stored in the scan list and located at the head position.

For example, when 4 seconds are required for the system scan of the communication system A and the communication system B, before ending the system scan of all communication systems stored in the scan list, the system scan by the next send operation is requested. For this reason, the system scan of a communication system C and on cannot be executed. When a system scan request due to a new send operation arrives, the system scan will be executed again from the communication system A.

In such a case, during the send operation, the system scan is not executed for the communication system C and on. For this reason, if the area around the wireless communication terminal has changed to a state where signals of the communication system C are stable, irrespective of the fact that there is a communication system which can be acquired (communication system C), no opportunity for acquiring that communication system is obtained, so the send operation becomes impossible.

According to the above first transmission operation TSM1, when there are a plurality of communication systems which can be acquired by the wireless communication terminal and there is a possibility that a time longer than the time Tp is required for scanning all of those, sometimes all communication systems cannot be completely scanned.

This operation sometimes becomes a problem from the viewpoint of the sending success rate. In order to raise the success rate of a send operation in a situation where there is no clue at all which communication system to stand by at, the system scan of all communication systems which can be acquired must be executed.

This problem can be solved by adjusting a Tp time length. However, the communication systems which can be acquired by the wireless communication terminal are fixed, and the time required for the acquisition of one communication system varies according to the signal conditions of the area, therefore the "maximum time required for acquisition x number of acquisition enabled communication systems" must be determined as the Tp time.

Determination of the Tp time by the product of the general time regarded as necessary for acquisition of one communication system and the number of all communication systems which must be acquired results in the best acquisition efficiency when not considering various types of errors, therefore changing the Tp time is still not preferred. With the former, the change of the communication system is difficult, while with the latter, there is the inconvenience that useless waiting time occurs.

For this reason, the wireless communication terminal 10 of the present embodiment has the function of not restarting a system scan in the sequence based on the communication systems stored in the scan list when receiving a new send request during the execution of the system scan along with an out-of-service-area send request, but restarting the system scan from the communication system next to the communication system for which the failure of acquisition was decided last in the previous system scan.

According to the wireless communication terminal 10 having this function, the inconvenience of the no opportunity being given for acquiring the communication system and the send operation being impossible irrespective of the fact that there is a communication system which can be acquired can be eliminated. The sending success rate can be improved as a result of this.

Figure 3:
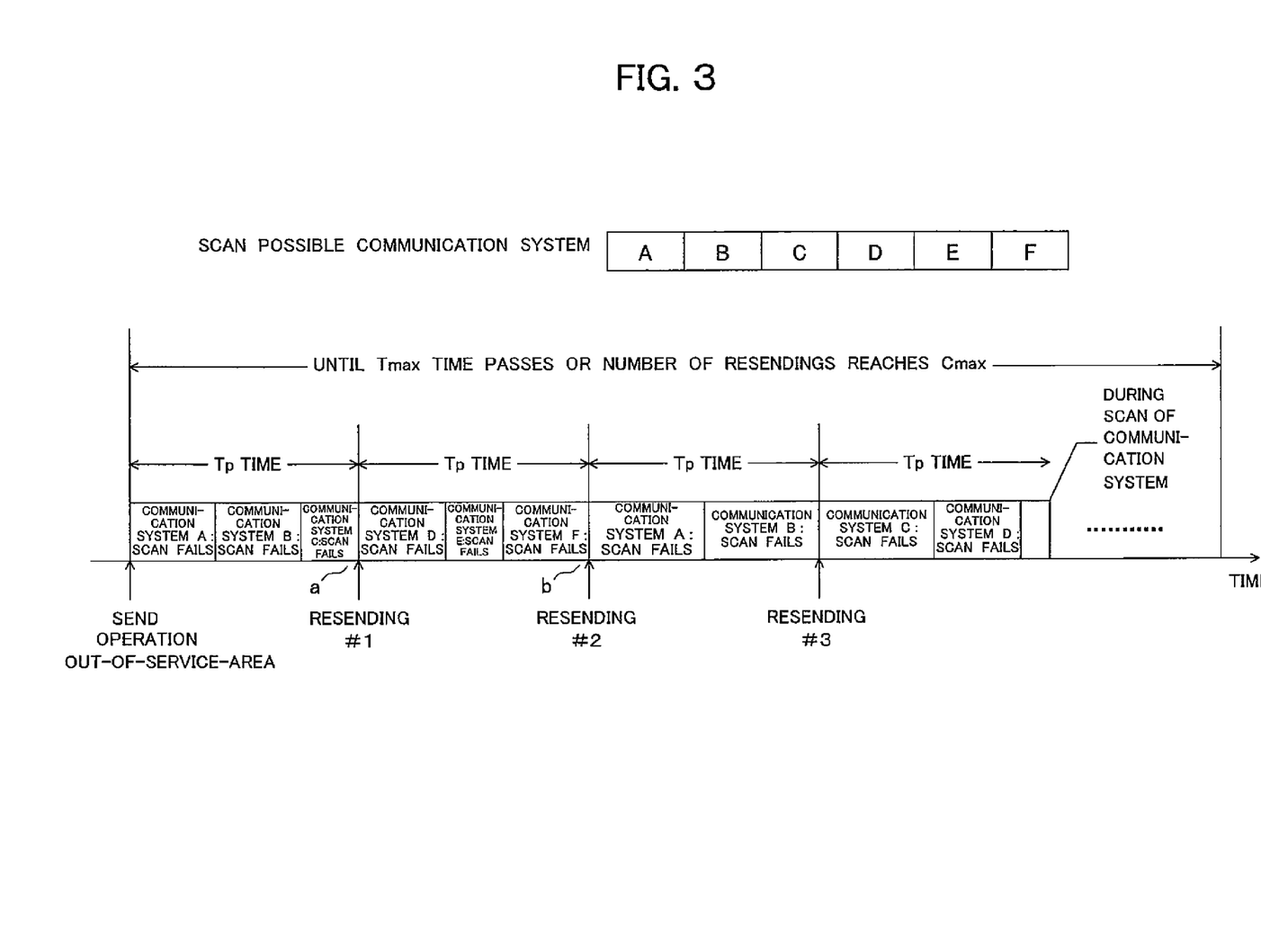
FIG. 3 is a timing chart showing a second send operation from an "out-of-service-area" state of a multiband wireless communication terminal on a time axis.

FIG. 3 shows a timing chart of a modified second transmission operation TSM2 from out-of-service-area of the above multiband wireless communication terminal.

In the second transmission operation TSMB, during an out-of-service-area send operation (acquisition carried out in a sequence of communication systems A, B, and C and acquisition failure decided in each), the wireless communication terminal 10, as shown in FIG. 3, stores an index (showing an address of a scan list and the index of the communication system C here) of the communication system in which failure of the system scan was decided last in the system scan operation along with the previous out-of-service-area send operation.

Then, when receiving a new send request (re-sending #1) at a point of timing a, based on that stored index, the wireless communication terminal 10 makes a communication system corresponding to the next index of the scan list (here, a communication system D) restart the system scan.

Note that, when the system scan of all communication systems stored in the scan list ends (timing b), the system scan is restarted from the head index position again.

Below, the configuration and operation of the wireless communication terminal according to the present embodiment solving the above inconveniences will be explained in detail.

Figure 4:
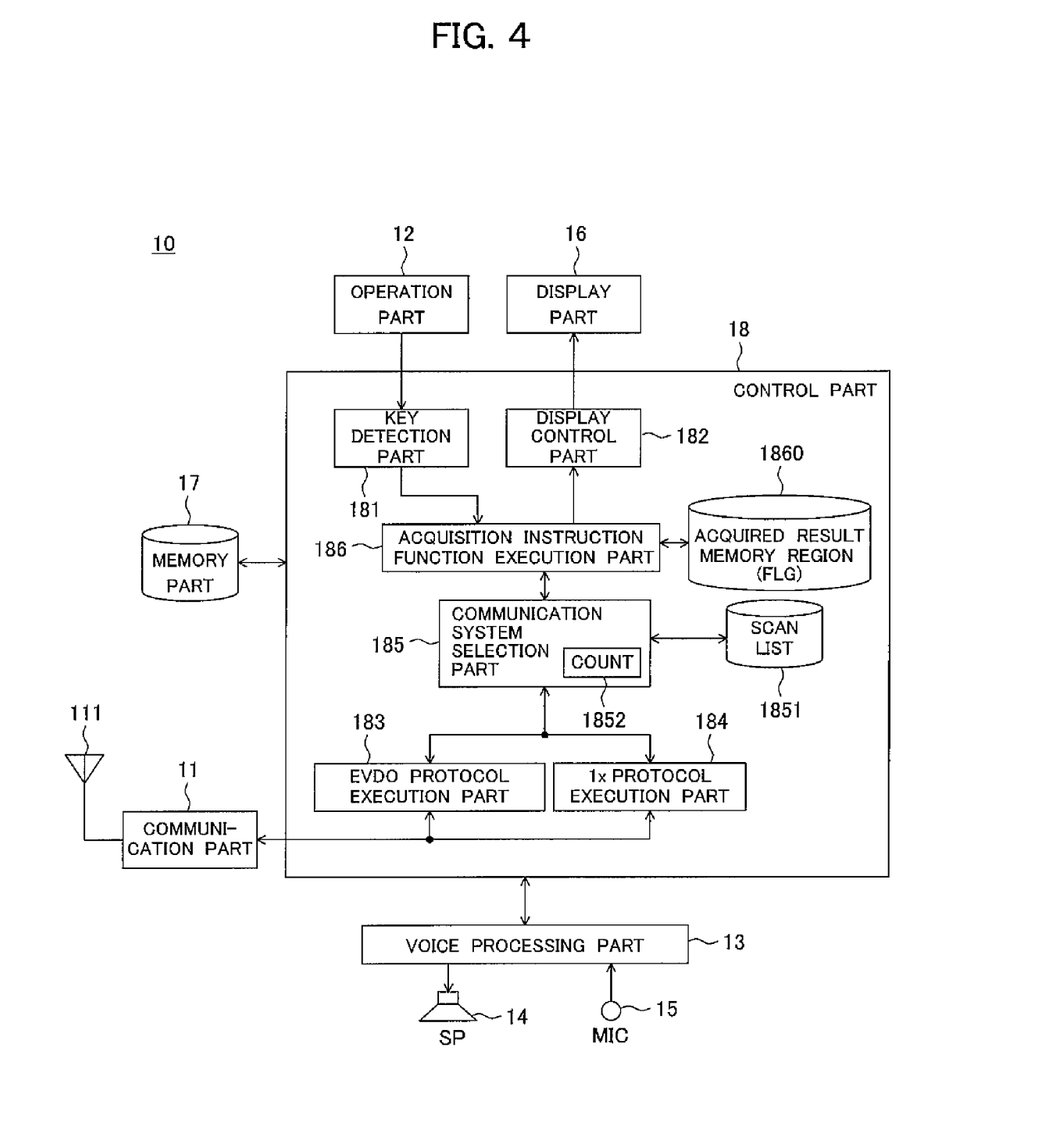
FIG. 4 is a block diagram showing an example of the configuration of a signal processing system of a wireless communication system according to an embodiment of the present invention.

FIG. 4 is a block diagram showing an example of the configuration of a signal processing system of a wireless communication terminal according to an embodiment of the present invention.

Here, function blocks of a signal processing system in a mobile phone used as the wireless communication terminal 10 will be illustrated as explained above.

This wireless communication terminal 10 used as a mobile phone has a communication part 11, operation part 12, voice processing part 13, speaker (SP) 14, microphone (MIC) 15, display part 16, memory part 17, and control part 18.

The communication part 11 acquires a plurality of communication systems and engages in wireless communication with the base station 20 connected to the communication network 30 according to a first communication protocol (for example, EVDO: Evolution Data Only) and a second communication protocol (for example, CDMA2000_"1x" protocol: hereinafter, abbreviated as "1x" protocol).

Note that, EVDO communication is faster than "1x" communication. "1x" communication has the feature of supporting voice communication in addition to data communication unlike EVDO communication.

The communication part 11 applies predetermined modulation processing to transmission data output by the control part 18 to convert this to a wireless signal which the communication part then transmits via an antenna 111. Further, the communication part applies predetermined demodulation processing to a wireless signal from the base station 20 received at the antenna 111 to convert this to reception data which the communication part then outputs to the control part 18.

The operation part 12 has, for example, a power key, speak key, number keys, letter keys, direction keys, an execute key, a send key, and other keys to which various functions are assigned. When these keys are operated by the user, the operation part 12 generates signals corresponding to those operation contents and inputs these as an instruction of the user to the control part 18.

The voice processing part 13 processes an audio signal output at the speaker 14 and audio signal input at the microphone 15.

Namely, the voice processing part 13 amplifies voice input from the microphone 15, performs analog-to-digital conversion, and further applies encoding or other signal processing to this to convert it to digital audio data and outputs the result to the control part 18.

Further, the voice processing part 13 applies decoding, digital-to-analog conversion, amplification, or other signal processing to the audio data supplied from the control part 18 to convert the same to an analog audio signal and outputs the result to the speaker 14.

Further, the display part 16 is configured by using, for example, a liquid crystal display panel, an organic EL (Electro-Luminescence) panel, or other display device and displays an image in accordance with a video signal supplied from the control part 18.

The display part 16 displays, for example, a phone number of a destination at the time of transmission, a phone number of the other party at the time of the reception, contents of received mail and transmitted mail, the date, time, remaining battery power, success of transmission, a waiting screen, and other various information and images.

The memory part 17 stores various types of data utilized for the processing in the control part 18.

The memory part 17 holds, for example, a program of a computer provided in the control part 18, an address book for managing personal information such as phone numbers and e-mail addresses of other parties, an audio file for playing back an incoming call sound and an alarm sound, an image file for the waiting screen, various types of setting data, temporary data utilized in the processing process of the program, and so on.

Note that, the above memory part 17 is configured by, for example, a nonvolatile memory device (nonvolatile semiconductor memory, hard disc device, optical disc device, etc.), a random accessible memory device (for example, SRAM or DRAM), or the like.

The control part 18 centrally controls the entire operation of the mobile phone.

Namely, the control part 18 controls the operations of the blocks explained above (the transmission/reception of signals at the communication part 11, input/output of voice at the voice processing part 13, display of an image in the display part 16, and other control) so that various types of processing of the mobile phone (audio speech carried out through a line exchange network, preparation and transmission/reception of e-mails, viewing of Internet Web (World Wide Web) sites, and so on) are executed in a suitable sequence in accordance with the operation of the operation part 12.

The control part 18 is provided with a computer (microprocessor) executing processing based on a program (operating system, application program, etc.) stored in the memory part 17 and runs the processing explained above according to the sequence instructed in this program.

Namely, the control part 18 sequentially reads command codes from the operating system, application program, or other program stored in the memory part 17 to execute the processing.

The control part 18 has a function of controlling the communication by the communication part 11 by using a first communication protocol (for example, EVDO protocol) or a second communication protocol (for example, "1x" protocol) in any of the plurality of communication systems when the start of communication is instructed by the operation part 12.

The control part 18 has a function of sending the communication part 11 an acquisition instruction instructing the acquisition processing until success in a predetermined sequence by a predetermined communication protocol by any of the plurality of communication systems when receiving an instruction of start of communication in a state judged as "out-of-service-area" in which communication cannot be carried out.

The control part 18 has a function of sending the communication part 11 the acquisition instruction again when a predetermined time has passed before the acquisition success is informed for the acquisition instruction and controlling the system so as to perform the processing of start of communication by the successfully acquired communication system when the acquisition success is informed for the acquisition instruction.

Further, when receiving a new acquisition instruction during execution of the acquisition processing, the control part 18 controls the system so as to perform the acquisition processing from the communication system next to the communication system last failing in the acquisition in the previous acquisition processing in a predetermined sequence.

Further, the control part 18 has a function of instructing the communication part of the end of the acquisition when the number of acquisition instructions reaches the predetermined number or a second predetermined time longer than the predetermined time is reached from when the instruction of start of communication was received.

The control part 18 has a function of making the display part 16 display failure of sending when instructing the communication part 11 of the end of the acquisition.

The control part 18 has a function of making a predetermined communication system start the acquisition processing based on a new acquisition instruction when the acquisition based on the previous acquisition instruction for the predetermined communication protocol is in progress when receiving a new acquisition instruction.

Further, the control part 18 has a function of judging that acquisition for a predetermined communication system failed when receiving a new acquisition instruction in a state where only the acquisition for the predetermined communication system was carried out as the acquisition processing based on the previous acquisition instruction and the judgment of success/failure of the acquisition for the predetermined communication system has not yet been made and making the communication system next to the predetermined communication system in the predetermined sequence start the acquisition processing based on the new acquisition instruction.

Below, the more concrete configuration and functions of the control part 18 will be explained.

The control part 18 is, as shown in FIG. 4, configured by a key detection part 181, display control part 182, EVDO protocol execution part 183, "1x" protocol execution part 184, communication system selection part 185, and acquisition instruction function execution part 186.

Note that the functions of these blocks are achieved by running a program stored in the memory part 17 at the control part 8. These do not indicate only blocks actually built-in the control part 18 discriminated from other blocks and just express the processing parts separated for simplifying the explanation.

The key detection part 181 has a function of detecting a send operation from the operation part 12 and activating the acquisition processing by the acquisition instruction function execution part 186, while the display control part 182 has a function of displaying success or failure of the send output via the acquisition instruction function execution part 186 in the display part 16. Each achieves a role as a user interface.

Further, the EVDO protocol execution part 183 functions as the first protocol execution part instructing the communication part 11 of acquisition by the first communication protocol (EVDO protocol), and the "1x" protocol execution part 184 functions as a second protocol execution part instructing the communication part 11 of acquisition by the second communication protocol ("1x" protocol).

The communication system selection part 185 has a function of instructing the communication part 11 of the communication system to be acquired.

When receiving the acquisition instruction from the acquisition instruction function execution part 186, the communication system selection part 185 makes the EVDO protocol execution part 183 or "1x" protocol execution part 184 perform this acquisition processing according to a predetermined sequence until the acquisition is successful, while informs that the acquisition is successful to the acquisition instruction function execution part 186 when the acquisition is successful in any communication system.

Further, when receiving a new acquisition instruction during execution of the acquisition processing, the communication system selection part 185 makes the EVDO protocol execution part 183 or "1x" protocol execution part 184 perform this acquisition processing from the communication system next to the communication system last failing in acquisition in the previous acquisition processing in the predetermined sequence.

Now assume that the communication system selection part 185 secures a memory region needed for the system scan accompanied by the send processing at the time of the "out-of-service-area" state. This memory region is concretely a scan list 1851 and a counter region (count) 1852 in which index values obtained by counting as will be explained later are stored.

In the scan list 1851, communication systems which can be acquired by the present mobile terminal are stored in a form of a list, and contents thereof are set when turning on a power supply. Further, in the counter region 1852, when running the system scan, an index value pointing out the communication system on the scan list 1851 to be scanned is stored, and "0" is set at the time of turning on the power supply or when receiving the system scan request along with the end of the send processing.

The memory region shown here is concretely assigned to a suitable region in the memory part 17 and stored.

The acquisition instruction function execution part 186 has a function of instructing the communication system selection part 185 to start the acquisition of the communication system.

When the start of the communication is requested in a state judged as "out-of-service-area" in which the present mobile terminal cannot perform the communication, the acquisition instruction function execution part 186 sends the communication system selection part 185 an acquisition instruction for instructing the acquisition of any of a plurality of communication systems.

When a predetermined time (Tp; for example, 4 seconds) has passed before the acquisition success is informed for this acquisition instruction, the acquisition instruction function execution part 186 sends the communication system selection part 185 the acquisition instruction again, and, when the acquisition success is informed for the acquisition instruction, performs the processing of the start of the communication by the successfully acquired communication system.

Note that when the number of times of the acquisition instruction reaches the predetermined number (Cmax) from when the start of communication was requested or the second predetermined time (Tmax: for example, 40 seconds) longer than the predetermined time is reached, the acquisition instruction function execution part 186 sends to the communication system selection part 185 an instruction for ending the acquisition.

Further, the acquisition instruction function execution part 186 has an acquired result memory region 1860. In the acquired result memory region 1860, when the acquisition fails as the result of acquisition for each communication system which is informed by the communication system selection part 185, the flag FLG is made ON. This flag FLG is updated and retained at each system scan.

The result of acquisition of the communication system selection part 185 written in the acquired result memory region 1860 is referred by the acquisition instruction function execution part 186 at a suitable timing as will be explained later. This part performs re-try of acquisition processing or processing making the display part 16 display the send failure.

The acquired result memory region 1860 shown here is concretely assigned to and stored at an appropriate region of the memory part 17.

Figure 5:
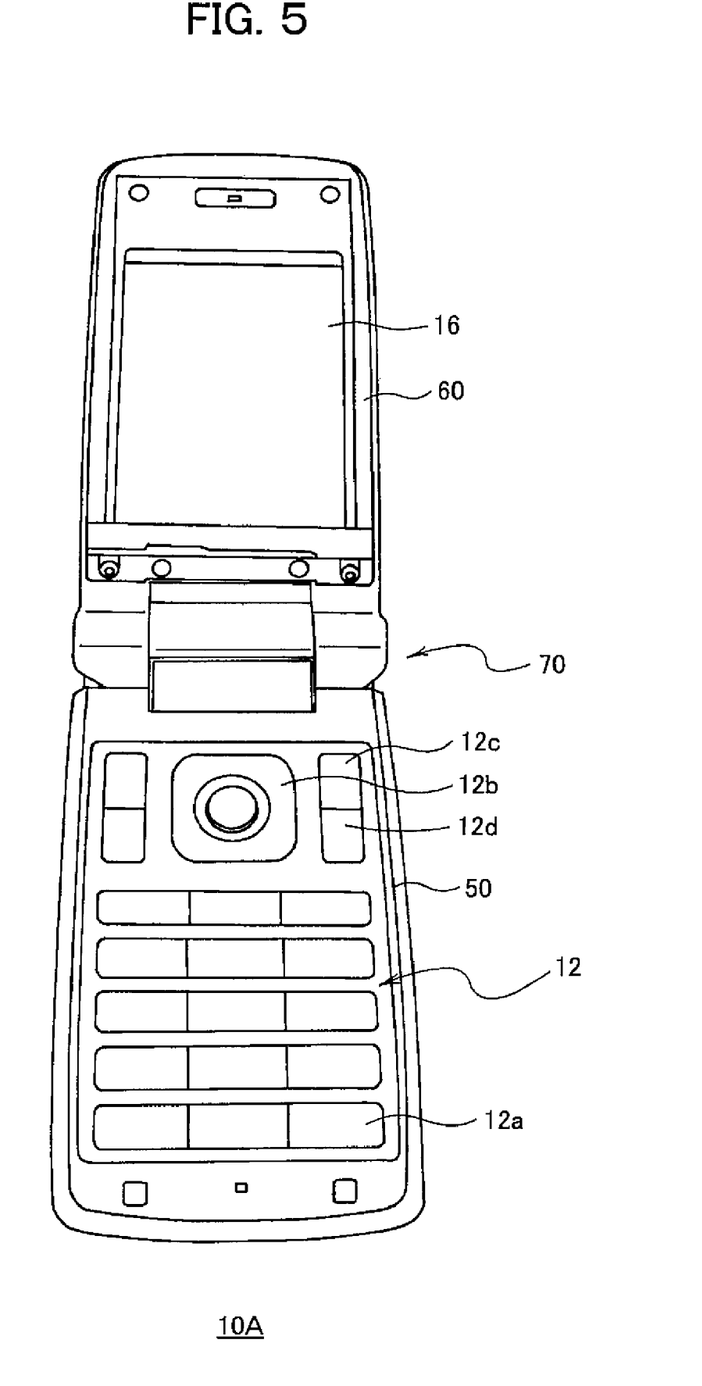
FIG. 5 is a perspective view showing an example of the configuration of an outer appearance of a mobile phone as a mobile terminal device according to an embodiment of the present invention.

FIG. 5 is a perspective view showing an example of the configuration of the outer appearance of a mobile phone used as a wireless terminal device according to an embodiment of the present invention. FIG. 5 mainly shows the array of keys.

As shown in FIG. 5, a wireless terminal device 10A is configured as a so-called flip-open type mobile phone and is provided with a sender case 50 and a receiver case 60 which are connected to each other pivotably between an open state and a closed state.

The sender case 50 and the receiver case 60 form a housing of the wireless communication terminal as a whole by connection of end portions by a connection part 70 serving as the center axis of relative opening and closing operations.

The sender case 50 is provided with an operation input part 12 in which various types of keys exposed at the front surface are arranged. Further, the receiver case 60 is provided with a display part 16.

In the operation input part 12 of the sender case 50, as various types of keys, for example, a ten-key part 12a, a cursor key 12b, a function key 12c etc. are arranged.

To each of the tenkey part 12a described above, each of a plurality of characters concerning Chinese character, Roman character, KANA, and symbol is assigned.

Effective characters intended by the ten-key part 12a are switched by a toggle operation by an "input mode change key (specific key)" assigned to any of the function key 12c.

Any of these keys, for example, the function key 12c is assigned as the operation key for performing transmission instruction etc.

Note that, this operation key may be assigned to a not shown side key as well, which is arranged on a side surface of the sender case.

Next, an example of operation of the wireless communication terminal 10 of FIG. 4 will be explained.

Figure 6:
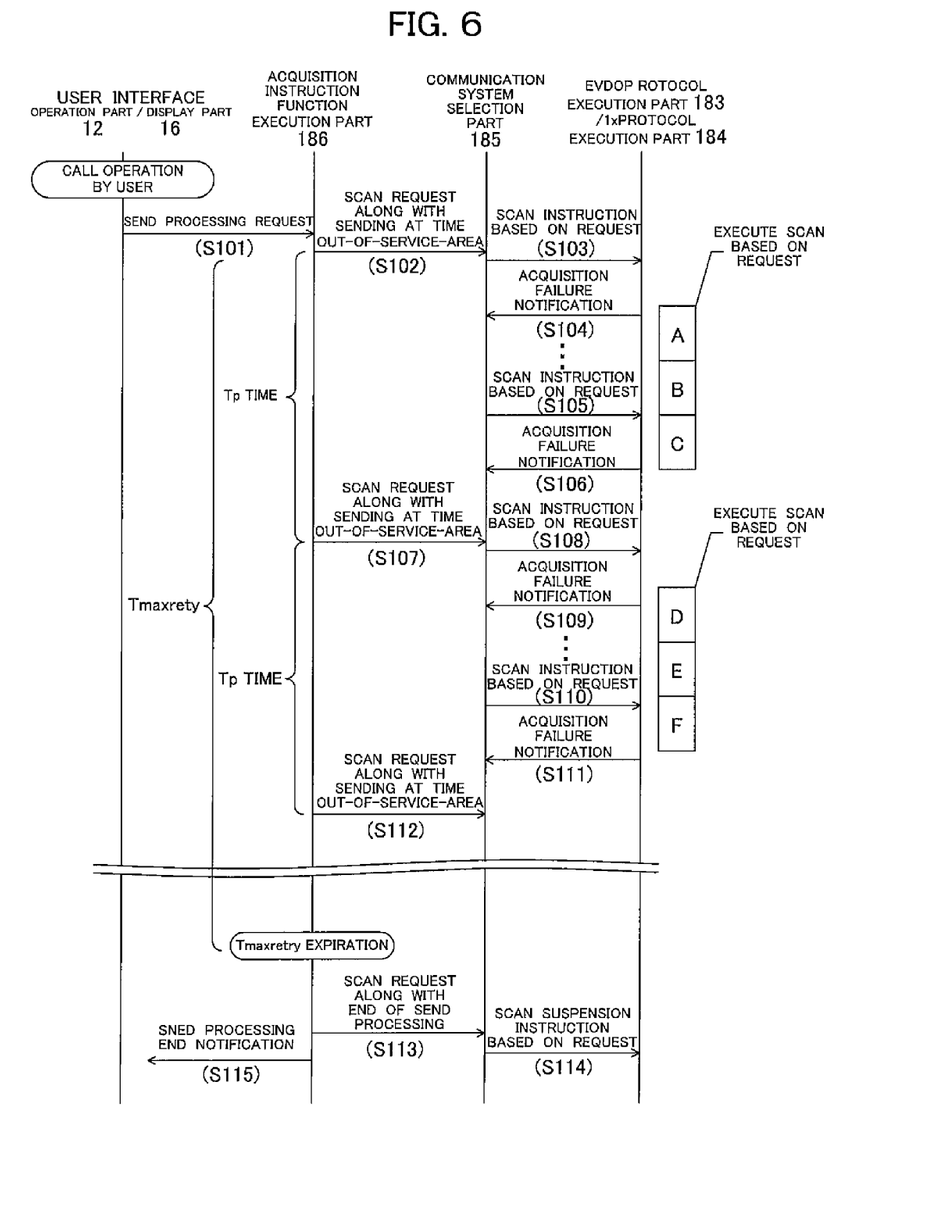
FIG. 6 is an operation sequence diagram cited for explaining the operation of a wireless communication terminal according to the embodiment of the present invention.

FIG. 6 is an operation sequence diagram cited for explaining the send operation from out-of-service-area of a wireless communication terminal having the above configuration FIG. 6 shows an operation sequence among the user interface configured by the operation part 12 and the display part 16, the acquisition instruction function execution part 186, the communication system selection part 185, and the EVDO protocol execution part 183 ("1x" protocol execution part 184) forming the control part 18.

Below, the operation of the wireless communication terminal according to the embodiment of the present invention shown in FIG. 4 will be explained with reference to FIG. 6.

In the operation sequence diagram of FIG. 6, in the state where the mobile phone is "out-of-service-area", if the user operates the operation part 12 of the mobile phone (depresses the send key etc.), the control part 18 obtains a send processing request via the user interface (here, key detection part 181) and starts up the acquisition instruction function execution part 186 (S101).

Here, "out-of-service-area" means the state where the wireless communication terminal 10 can no longer acquire any communication system, the out-of-service-area flag is turned ON inside the wireless communication terminal, and "out-of-service-area" is displayed on the screen of the display part 16 as an antenna picture and the state in which the restitute processing is periodically executed.

Further, "in-area reset processing" means processing performing a system scan (reception frequency search), and if there is a found frequency, judging whether or not a channel (communication system) is usable by analyzing a pilot signal informed in that frequency, and acquiring the communication system when the pilot signal strength exceeds a predetermined level, and resetting to the communication possible state (in area).

The acquisition instruction function execution part 186 acquires the above send processing request via the user interface and outputs a scan request along with the send operation at the time of the "out-of-service-area" state to the communication system selection part 185 in order to acquire a communication system required for a send operation before executing the send processing based on the request and instructs execution of that (S102).

When a scan request is output from the acquisition instruction function execution part 186, the communication system selection part 185 starts up selection of the communication system by referring to the scan list in which candidates of communication systems to be acquired are listed.

The communication system selection part 185 selects the EVDO communication system in the case of data transmission or selects the "1x" communication system in the case of voice transmission and instructs the EVDO protocol execution part 183 or "1x" protocol execution part 184 to execute the scan operation based on the request (S103).

The EVDO protocol execution part 183 or "1x" protocol execution part 184 selected by the communication system selection part 185 informs the result (success or failure) of acquisition of that communication system to the communication system selection part 185 as a result of the system scan by the selected communication system (S104).

When the acquisition of the communication system succeeds, the communication system selection part 185 instructs the send processing using that communication system to the acquisition instruction function execution part 186. When the acquisition of the communication system fails, the communication system selection part 185 instructs the execution of the system scan based on the request again to the EVDO protocol execution part 183 or "1x" protocol execution part 184 which previously executed the system scan in order to scan communication systems by the same protocol (S105).

Note that the communication system covered by the system scan is sometimes a communication system covered by a system scan earlier and is sometimes another communication system of the same protocol not earlier scanned. At this time, the communication system selection part 185 simultaneously informs the acquisition instruction function execution part 186 of acquisition failure of the communication system. Here, "informing" means outputting a signal showing the failure of acquisition of the communication system.

The acquisition instruction function execution part 186 waits to be informed of acquisition success from the communication system selection part 185 for a Tp time (for example, 4 seconds) after outputting the scan request based on the send processing request to the communication system selection part 185.

Here, when a notice of acquisition success is not output from the communication system selection part 185 for 4 seconds, the acquisition instruction function execution part 186 outputs the scan request along with a send operation at the time of an "out-of-service-area" state to the communication system selection part 185 again to re-try the above system scan (S107). Here, assume that acquisition failure has been informed for the communication systems A, B, and C at this point of time.

At this timing, the communication system selection part 185 and EVDO protocol execution part 183 or "1x" protocol execution part 184 which had been selecting the communication system and acquiring it cancel the communication system scan operation currently in progress (here, the communication system C), perform a system scan operation based on the scan request along with the send operation at the time of the "out-of-service-area" state which was received again from the acquisition instruction function execution part 186, and inform success/failure of acquisition for each (S108 to S111).

Note, in the processing of step S108, the communication system selection part 185 sends the EVDO protocol execution part 183 or "1x" protocol execution part 184 an instruction for executing the system scan from a communication system (here, communication system D) next to the communication system for which the failure of acquisition was last decided by the scan request along with the previous send operation at the time of the "out-of-service-area" state. Details of this portion will be explained later by using a flow chart shown in FIG. 7.

The communication system selection part 185 and EVDO protocol execution part 183 or "1x" protocol execution part 184 repeat the acquisition attempts of the communication system described above until the communication system can be acquired on the occasion of execution of re-try of the system scan based on the scan request (S107, S112) along with the re-sending at the time of the "out-of-service-area" state which arrives at an interval of Tp time and acquire the results of success/failure of acquisition of the communication system. If the acquisition instruction function execution part 186 receives a notice of acquisition success from the communication system selection part 185, the execution part performs the send processing at that timing.

In this way, the acquisition instruction function execution part 186 performs a scan request (S107, S112) along with a send operation at the time of the "out-of-service-area" state by the re-try function at an interval of Tp time (for example, 4 seconds). When a communication system cannot be acquired even if the send operation is continued for Tmax time (for example, 40 seconds) longer than the Tp time, the system issues a scan suspension request along with the end of the send operation to the communication system selection part 185 (S113).

The communication system selection part 185 receiving this instructs the EVDO protocol execution part 183 or "1x" protocol execution part 184 of scan suspension based on the request (S114), and the EVDO protocol execution part 183 or "1x" protocol execution part 184 ends the execution of the system scan. Due to this, the send processing out-of-service-area is ended.

Further, the acquisition instruction function execution part 186 controls the user interface (display control part 182) to display a failure of sending (send processing end notification) on the display part 16 (S115). Note, the system scan operation for restitution into the service area is continued.

In this regard, in the operation sequence of FIG. 6 described above, assume that acquisition failure has been already informed for the communication systems A and B (C is on the middle of execution) when receiving a new acquisition instruction (scan request along with a send operation at the time of the "out-of-service-area" state) during execution of the acquisition processing.

Further, an explanation was given, with reference to the operation sequence of FIG. 6, of an example where the communication system selection part 185 instructed the EVDO protocol execution part 183 or "1x" protocol execution part 184 to execute the system scan from a communication system (here, communication system D) next to the communication system last failing in acquisition by the scan request along with the previous send operation at the time of the "out-of-service-area" state.

In the example shown in the operation sequence of FIG. 6, when a new acquisition for re-try is instructed after acquiring a plurality of communication systems and an acquisition attempt of any communication system is currently in progress, it is predicted that a long enough time could not be taken for the last acquisition attempt if an acquisition attempt of a plurality of communication systems was carried out within one Tp time, therefore this must be re-tried for communication systems for which acquisition attempt was cancelled in the middle.

Further, for example, when receiving a new acquisition instruction in a state where only the acquisition for the communication system A was carried out and success/failure of acquisition for the communication system A has not yet been judged, the communication system selection part 185 may judge that the previous acquisition for the communication system A failed and make the EVDO protocol execution part 183 or "1x" protocol execution part 184 start the acquisition processing based on the new acquisition instruction from the communication system B.

Namely, when an acquisition attempt was carried out for only one communication system within one Tr time and in addition it was cancelled in the middle, it is exceptionally regarded as a failure decision for that communication system.

This is considered because if a success/failure judgment cannot be carried out for 4 or more seconds in acquisition of one communication system, even if the acquisition of that communication system is tried many times and even if a new acquisition instruction for re-try (re-scan request along with the send operation at the time of the "out-of-service-area" state) is issued every time, the acquisition attempt is just carried out for the same communication system. In the end, there is a possibility of the Tmax time elapsing without any communication system being acquired after all. Therefore, the system scan can be more efficiently executed if the acquisition of that communication system is given up and the next communication system is acquired.

Figure 7:
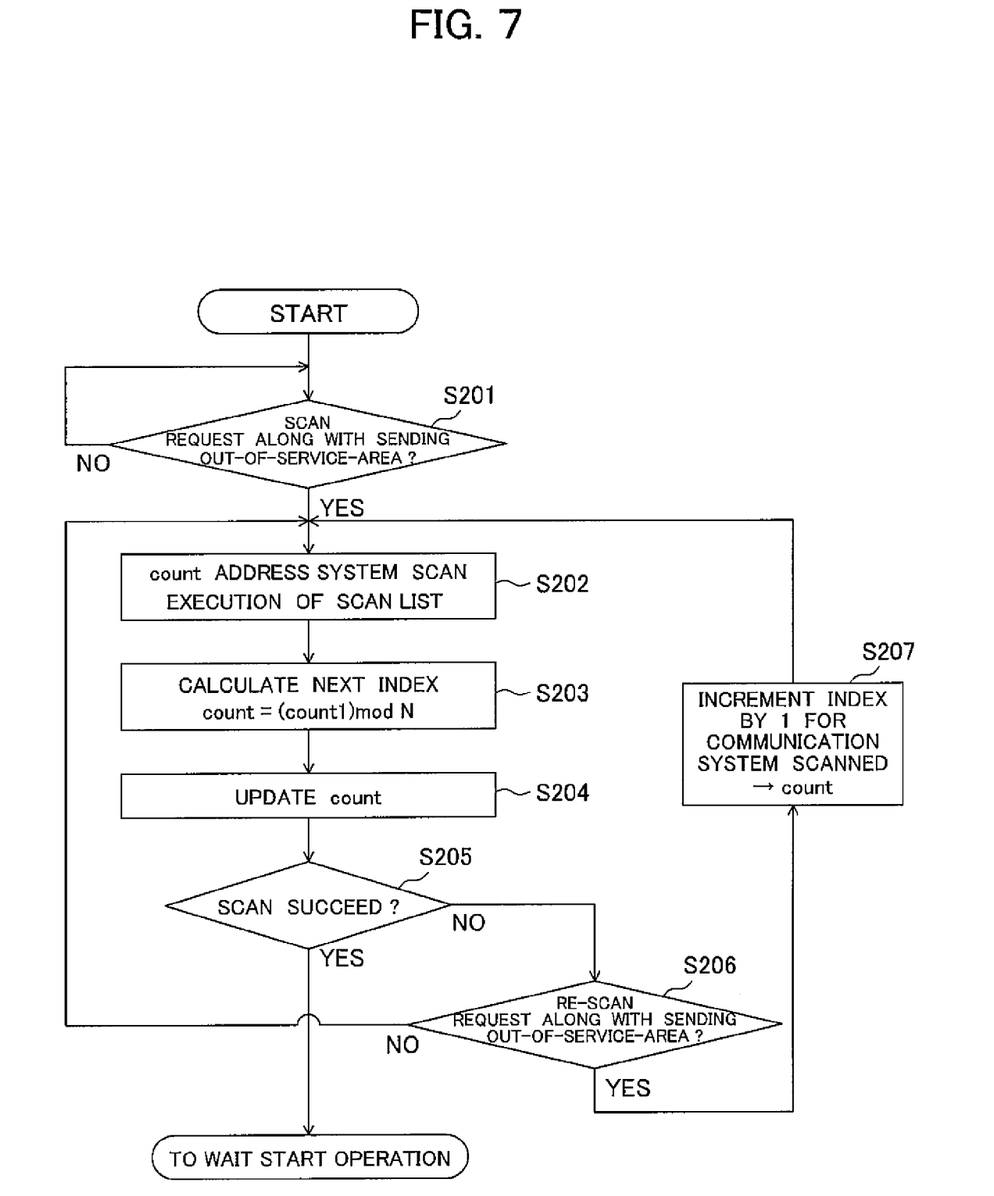
FIG. 7 is a flow chart for explaining the operation of a wireless communication terminal according to the embodiment of the present invention.

FIG. 7 is a flow chart showing a system selection processing of the communication system selection part 185 described above.

Below, the operation of the communication system selection part 185 will be explained in detail with reference to the flow chart shown in FIG. 15.

As shown in the flow chart of FIG. 7, when receiving a scan request along with an out-of-service-area send operation from the acquisition instruction function execution part 186 (S201 "Yes"), the communication system selection part 185 reads out the communication system stored at an address (count address) corresponding to a setting value of the counter region 1852 as the index of the scan list 1851 and instructs the EVDO protocol execution part 183 or "1x" protocol execution part 184 to execute that acquisition attempt (system scan) (S202).

Here, in the counter region 1852, indexes (0 to N+1) are set as addresses on the scan list 1851 of communication systems to be scanned and are referred to by the communication system selection part 185.

Note that, N is the number of communication systems stored in the scan list 1851, and "0" is set in the counter region (count) 1852 when turning on the power supply and starting the send processing. Further, "0" is set in the counter region (count) 1852 when ending the send processing as well.

When starting the execution of the system scan of the communication system corresponding to the count number of the scan list 1851, the communication system selection part 185 executes a residual calculation (count+1)$_{mod}$N in order to calculate the index for executing the next system scan and sequentially updates the index value (S203). Then, every time, the updated index value is stored in the predetermined counter region (count) 1852 of the memory part 17 (S204).

Next, the communication system selection part 185 obtains information concerned with the success/failure of acquisition as the result of the system scan from the EVDO protocol execution part 183 or "1x" protocol execution part 184.

Here, when it is judged that the acquisition failed (S205 "No"), the communication system selection part 185 further judges if there was an arrival of any re-scan request along with the out-of-service-area send operation from the acquisition instruction function execution part 186 (S206).

Here, when there is a re-scan request along with the out-of-service-area send operation (S206 "Yes"), the communication system selection part 185 instructs the EVDO protocol execution part 183 or "1x" protocol execution part 184 to cancel the system scan operation of the communication system (here, communication system C) currently in progress.

Then, in order to execute the system scan operation based on the scan request along with the out-of-service-area send operation received again, the communication system selection part 185 updates the index so as to execute the system scan from a communication system (communication system D) next to the communication system (communication system C) last failing in acquisition by the scan request along with the previous out-of-service-area send operation (S207).

Namely, in the predetermined region (counter region 1852) of the memory part 17, the index value used for the system scan immediately before this time is stored. Therefore, by reading out this, incrementing the index value by 1, and repeatedly executing the processing of S202 and on, the system scan can be executed from the communication system next to the communication system for which the acquisition last failed by the scan request along with the previous out-of-service-area send operation.

Note that, in the processing of step S205, when the acquisition was successful (S205 "Yes"), the routine shifts to the standby start operation, and the communication processing by the successfully acquired communication system by the acquisition instruction function execution part 186 is started.

Further, it is configured so that a count is carried out at step S203 before judging the scan result at step S205 when the execution of the system scan is started. Therefore, when the system scan for the communication system is not completed within the Tp time, but a re-scan request occurs, at the time of re-scan, the acquisition can be started from the communication system next to the cancelled communication system.

As explained above, according to the present embodiment, by constructing a mechanism so that, when receiving a new send request during execution of the system scan along with the request of an out-of-service-area send operation, the system scan is not restarted in a sequence based on communication systems stored in the scan list 1851, but the system scan is restarted from the communication system next to the communication system last failing in acquisition in the previous system scan, the inconvenience of the send operation becoming impossible since no opportunity for acquiring the communication system is given irrespective of the existence of a communication system which can be acquired can be solved.

Accordingly, the wireless communication terminal capable of efficiently acquiring the communication system when send processing occurs even in a state judged "out-of-service-area" and capable of achieving connection by the communication scheme desired by the user as much as possible can be provided.

Note that, according to the embodiment described above, the acquisition instruction function execution part 186 is based on existing configurations. It can efficiently acquire all of the communication systems which can be acquired without any great change of the configuration of the communication system selection part 185. No modification of the infrastructure side is necessary at all. Therefore, the embodiment can be realized very cheaply.

Note that, according to the above embodiment, the mobile phone was illustrated as the wireless communication terminal, but the same effects are obtained even when the invention is applied to other devices such as a PDA (Personal Digital Assistant), PC (Personal Computer), or game machine.

Further, the functions of the constituent blocks of the wireless communication terminal according to the present embodiment may be all realized by software or at least a portion may be realized by hardware. For example, the processing in the control part 18 and the data processing in the communication part 11 and the voice processing part 13 may be realized in a computer by one or more programs. Further, at least a portion may be realized by hardware as well.

INDUSTRIAL APPLICABILITY

According to the present invention, even in a state judged "out-of-service-area", when a send processing occurs, it is possible to efficiently acquire a communication system and to achieve connection according to the communication scheme desired by the user as much as possible. Therefore, the invention can be applied to a mobile phone or other wireless communication terminal preferably used for a multiband wireless communication system.

The invention claimed is:

1. A wireless communication terminal comprising:
a communication part capable of acquiring a plurality of communication systems and capable of communication by a predetermined communication protocol; and
a control part which controls communication by the communication part by any of the plurality of communication systems using the predetermined communication protocol when a send operation is instructed,
wherein the control part
sends the communication part an acquisition instruction instructing the acquisition processing until success in a predetermined sequence by the predetermined communication protocol by any of the plurality of communication systems when receiving an instruction of a send operation in a state judged "out-of-service-area",
sends the acquisition instruction again to the communication part when a predetermined time has passed before acquisition success is informed for the acquisition instruction,
performs processing for starting communication by a successfully acquired communication system when an acquisition success is informed for the acquisition instruction, and
controls the system so as to perform the acquisition processing from a communication system next to a communication system last failing in acquisition in a previous acquisition processing in the predetermined sequence when receiving a new acquisition instruction during execution of the acquisition processing.

2. A wireless communication terminal as set forth in claim 1, wherein the control part instructs the communication part to end the acquisition when a number of times of the acquisition instruction reaches a predetermined number of times or a second predetermined time longer than the predetermined time is reached from when the send operation was instructed.

3. A wireless communication terminal as set forth in claim 2, wherein the terminal further includes a display part, and
wherein the control part makes the display part display sending failure when instructing the communication part to end the acquisition.

4. A wireless communication terminal as set forth in claim 1, wherein the control part makes the predetermined communication system start the acquisition processing based on the new acquisition instruction when the acquisition based on the previous acquisition instruction for the predetermined communication protocol is currently in progress when receiving the new acquisition instruction.

5. A wireless communication terminal as set forth in claim 1, wherein the control part judges that the acquisition for the predetermined communication system failed and makes the communication system next to the predetermined communication system in the predetermined sequence start the acquisition processing based on the new acquisition instruction when only acquisition for the predetermined communication system is carried out as the acquisition processing based on the previous acquisition instruction and the new acquisition instruction is received in a state when it has not yet been judged whether or not the acquisition for the predetermined communication system is successful.

6. A wireless communication terminal comprising:
a communication part capable of acquiring a plurality of communication systems and capable of communication by a predetermined communication protocol; and
a control part which controls communication by the communication part by any of the plurality of communication systems using the predetermined communication protocol when a send operation is instructed, wherein
the control part has
a communication system selection part instructing the communication part of the communication system to be acquired,
a protocol execution part instructing the communication part of acquisition by the predetermined communication protocol, and
an acquisition instruction function execution part instructing the communication system selection part of the start of acquisition of the communication system,
wherein the acquisition instruction function execution part
sends the communication system selection part an acquisition instruction instructing the acquisition of any of the plurality of communication systems when receiving an instruction of a send operation in a state judged "out-of-service-area" in which communication cannot be carried out,
sends to the communication system selection part the acquisition instruction again when a predetermined time has passed before acquisition success is informed for the acquisition instruction, and
performs processing for starting communication by a successfully acquired communication system when acquisition success is informed for the acquisition instruction, and
wherein the communication system selection part
makes the protocol execution part perform the acquisition processing for the plurality of communication systems according to a predetermined sequence until the acquisition is successful when receiving the acquisition instruction,
informs the acquisition instruction function execution part that the acquisition was successful when the acquisition was successful in any communication system, and
makes the protocol execution part perform the acquisition processing from a communication system next to the communication system last failing in acquisition in the previous acquisition processing in the predetermined sequence when receiving a new acquisition instruction during execution of the acquisition processing.

7. A wireless communication terminal as set forth in claim 6, wherein the acquisition instruction function execution part instructs the communication system selection part to end the acquisition when a number of the acquisition instruction reaches a predetermined number or a second predetermined time longer than the predetermined time is reached from when the send operation was instructed.

8. A wireless communication terminal as set forth in claim 7, wherein the terminal further includes a display part, and
wherein the acquisition instruction function execution part makes the display part display sending failure when instructing the communication part of ending the acquisition to end the acquisition.

9. A wireless communication terminal as set forth in claim 6, wherein the communication system selection part makes the protocol execution processing part start the acquisition processing based on the new acquisition instruction from the predetermined communication system when the protocol execution processing part is in the middle of acquisition based on the previous acquisition instruction for the predetermined communication protocol when receiving the new acquisition instruction.

10. A wireless communication terminal as set forth in claim 6, wherein the communication system selection part judges that the acquisition for the predetermined communication system failed when receiving the new acquisition instruction in a state where only the acquisition for the predetermined communication system was carried out at the protocol execution processing part as the acquisition processing based on the previous acquisition instruction and the judgment whether or not the acquisition for the predetermined communication system was successful has not yet been made and makes the protocol execution part start the acquisition processing based on the new acquisition instruction from the communication system next to the predetermined communication system in the predetermined sequence.

11. A wireless communication terminal as set forth in claim 6, wherein
the protocol execution part includes
a first protocol execution part instructing the communication part of the acquisition according to the first communication protocol, and
a second protocol execution part instructing the communication part of the acquisition according to the second communication protocol, and
wherein the communication system selection part selects either of the first protocol execution part and the second protocol execution part and makes it perform the acquisition processing.

12. A wireless communication terminal as set forth in claim 11, wherein the state "out-of-service-area" is a state where neither the first protocol execution part nor the second protocol execution part can acquire any of the communication systems, the acquisition instruction function execution part makes the display part display "out-of-service-area", and the restitute processing by the communication part is executed.

13. A communication control method of a wireless communication system comprising:
a communication part capable of acquiring a plurality of communication systems and capable of executing communication by a predetermined communication protocol; and
a control part which controls communication by the communication part by any of the plurality of communication systems using a predetermined communication protocol when a send operation is instructed,
in which communication control method of a wireless communication system, the control part
sends the communication part an acquisition instruction instructing the acquisition processing by any of the plurality of communication systems in a predetermined sequence until the acquisition is successful according to the predetermined communication protocol when receiving a send instruction in a state judged "out-of-service-area" in which communication cannot be carried out,
sends the communication part the acquisition instruction again when a predetermined time has passed before the acquisition success is informed for the acquisition instruction,
performs the processing for starting the communication by the successfully acquired communication system when the acquisition success is informed for the acquisition instruction, and
performs the acquisition processing from a communication system next to the communication system last failing in acquisition in the previous acquisition processing in the predetermined sequence when receiving a new acquisition instruction during execution of the acquisition processing.

14. A communication control method of a wireless communication system as set forth in claim 13, which instructs the communication part to end the acquisition when a number of times of the acquisition instruction reaches a predetermined number of times or a second predetermined time longer than the predetermined time is reached from when the send operation was instructed.

15. A communication control method of a wireless communication system as set forth in claim 13, which displays failure of the send operation at the display part when instructing the communication part to end the acquisition.

16. A communication control method of a wireless communication system as set forth in claim 13, which starts the acquisition processing based on a new acquisition instruction from said predetermined communication system when the acquisition based on the previous acquisition instruction for the predetermined communication protocol is currently in progress when receiving the new acquisition instruction.

17. A communication control method of a wireless communication system as set forth in claim 13, which judges that the acquisition for the predetermined communication system failed and starts the acquisition processing based on a new acquisition instruction from the communication system next to said predetermined communication system in then predetermined sequence when only acquisition for the predetermined communication system is carried out as the acquisition processing based on the previous acquisition instruction and the new acquisition instruction is received in a state when it has not yet been judged whether or not the acquisition for the predetermined communication system is successful.

18. A wireless communication system including:
a base station; and
a wireless communication terminal performing wireless communication with the base station through a channel assigned by the base station,
wherein the wireless communication terminal has
a communication part capable of acquiring a plurality of communication systems and capable of executing communication according to a predetermined communication protocol and
a control part which controls communication by the communication part by any of the plurality of communication systems using the predetermined communication protocol when a send operation is instructed, and
wherein the control part
sends the communication part an acquisition instruction instructing the acquisition processing until success in a predetermined sequence by the predetermined communication protocol by any of the plurality of communication systems when receiving a send instruction in a state judged "out-of-service-area",
sends the acquisition instruction again to the communication part when a predetermined time has passed before an acquisition success is informed for the acquisition instruction,
performs processing for starting communication by a successfully acquired communication system when an acquisition success is informed for the acquisition instruction, and
controls the system so as to perform the acquisition processing from a communication system next to a communication system last failing in acquisition in a previous acquisition processing in the predetermined sequence when receiving a new acquisition instruction during execution of the acquisition processing.

* * * * *